United States Patent
Connor et al.

(10) Patent No.: US 10,691,466 B2
(45) Date of Patent: Jun. 23, 2020

(54) BOOTING A COMPUTING SYSTEM USING EMBEDDED NON-VOLATILE MEMORY

(71) Applicant: Intel Corporation, Santa Clara, CA (US)

(72) Inventors: Christopher Connor, Hillsboro, OR (US); Bruce Querbach, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 102 days.

(21) Appl. No.: 15/943,605

(22) Filed: Apr. 2, 2018

(65) Prior Publication Data

US 2019/0042275 A1    Feb. 7, 2019

(51) Int. Cl.
*G06F 9/4401* (2018.01)

(52) U.S. Cl.
CPC .......... *G06F 9/4405* (2013.01); *G06F 9/4406* (2013.01); *G06F 9/4401* (2013.01)

(58) Field of Classification Search
CPC ..... G06F 9/4405; G06F 9/4406; G06F 9/4401
See application file for complete search history.

(56) References Cited

U.S. PATENT DOCUMENTS

| | | | |
|---|---|---|---|
| 9,015,455 B2 | 4/2015 | Held et al. | |
| 9,041,146 B2 | 5/2015 | Lee et al. | |
| 9,660,181 B2 | 5/2017 | Lee et al. | |
| 2009/0327684 A1 | 12/2009 | Zimmer et al. | |
| 2009/0327741 A1 | 12/2009 | Zimmer et al. | |
| 2010/0169633 A1 | 7/2010 | Zimmer et al. | |
| 2011/0082971 A1* | 4/2011 | Berke | G06F 13/1694 711/105 |
| 2012/0063191 A1* | 3/2012 | Norman | G06F 3/061 365/100 |
| 2012/0191964 A1* | 7/2012 | Lee | G06F 11/2284 713/2 |
| 2013/0145080 A1* | 6/2013 | Grandin | G06F 9/44505 711/103 |
| 2013/0304980 A1* | 11/2013 | Nachimuthu | G06F 12/0246 711/103 |
| 2014/0264668 A1 | 9/2014 | Lee et al. | |
| 2014/0264679 A1 | 9/2014 | Lee et al. | |
| 2015/0095565 A1* | 4/2015 | Morris | G06F 3/0632 711/109 |
| 2015/0188033 A1 | 7/2015 | Lamborn et al. | |
| 2016/0203085 A1* | 7/2016 | Kranich | G06F 12/0802 713/2 |
| 2018/0088862 A1* | 3/2018 | Covington | G06F 3/0659 |

* cited by examiner

*Primary Examiner* — Phil K Nguyen
*Assistant Examiner* — Gayathri Sampath
(74) *Attorney, Agent, or Firm* — Compass IP Law, PC

(57) ABSTRACT

Examples include techniques for booting a computing system. A processor semiconductor chip includes one or more processing cores and an embedded non-volatile random-access memory (NVRAM), the NVRAM storing instructions that when executed by the one or more processing cores manages a boot process for a computing system.

7 Claims, 4 Drawing Sheets

BOOTING A COMPUTING SYSTEM USING EMBEDDED NON-VOLATILE MEMORY

TECHNICAL FIELD

Examples described herein are generally related to techniques for booting a computing system using an embedded non-volatile memory.

BACKGROUND

In computing, booting (or booting up) is the initialization of a computing system. The booting process can be "hard", e.g., after electrical power to the processor is switched from off to on (in order to diagnose particular hardware errors or reset the computing system), or "soft", when power on self-tests (POST) can be avoided. Both hard and soft booting can be initiated by hardware activation such as a button press, or by software command. Booting is complete when the normal, operative, runtime environment is attained.

On some computers, the boot up process can take tens of seconds, or even minutes, and typically involves performing a power-on self-test, locating and initializing peripheral devices, and then finding, loading and starting the operating system (OS). For some servers with a large number of I/O channels, dual in-line memory modules (DIMMs), and peripherals, performing testing of system components prior loading the OS may result in long boot times.

DETAILED DESCRIPTION

As contemplated in the present disclosure, booting of a computing system may be improved by storing a basic input/output system (BIOS) firmware architecture, such as Unified Extensible Firmware Interface (UEFI) BIOS, in an embedded NVRAM on the processor semiconductor chip. Since the BIOS is located on-die within the processor semiconductor chip and may securely access component configuration information stored therein, efficiencies in booting may be obtained over existing computing systems.

A BIOS is a computer program that initializes a computing system and loads an operating system (OS) for the computing system after completion of the power-on self-test (POST) actions. Within the hard reboot process, the BIOS runs after completion of the self-tests. In embodiments of the present invention, the BIOS is loaded into main memory from a persistent memory, such as an embedded NVRAM. The BIOS then loads and executes the processes that finalize the boot of the computing system. Like POST processes, the BIOS code comes from a "hard-wired" and persistent location; in this case a particular address in the embedded NVRAM. The BIOS acts as an interface between computer hardware and the OS, The BIOS includes instructions to initialize and enable low-level hardware services of the computing system, such as basic keyboard, video, disk drive, I/O ports, and memory controllers.

The initialization and configuration of the computing system by the BIOS occurs during a pre-boot phase. After system reset, the processor refers to a predetermined address which is mapped to the NVRAM in the processor semiconductor chip storing the BIOS (i.e., on-die). The processor sequentially fetches BIOS instructions from the NVRAM. These instructions cause the computing system to initialize its computing hardware, initialize its peripheral devices, and boot the OS.

Figure 1:
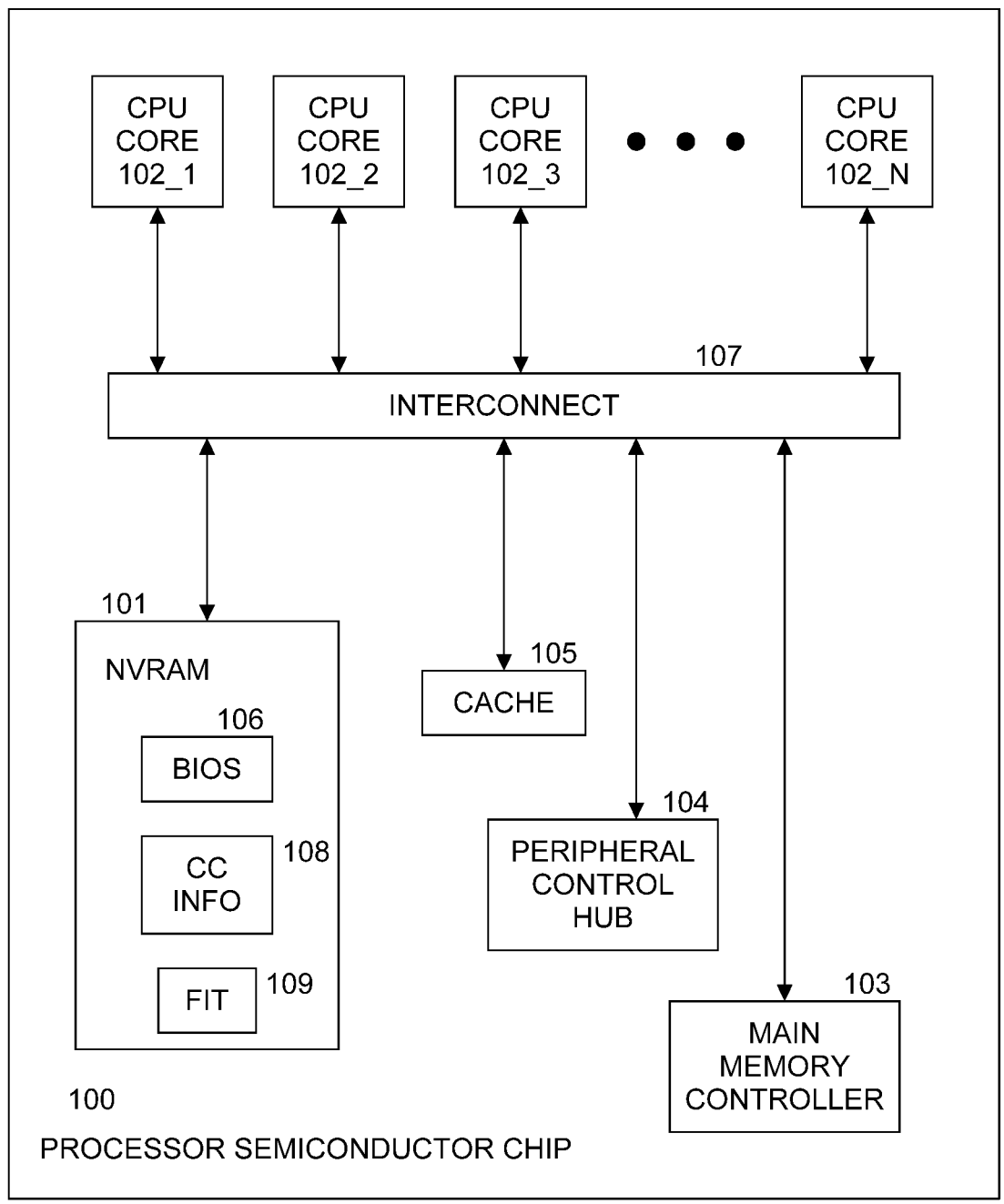
FIG. 1 illustrates an example processor semiconductor chip having an embedded non-volatile random-access memory (NVRAM).

FIG. 1 illustrates an example processor having an embedded non-volatile random-access memory (NVRAM). FIG. 1 shows an improved approach in which processor semiconductor chip 100 includes an embedded non-volatile memory that is used to store information and instructions of BIOS 106 that executes on processor 100. In an embodiment, the non-volatile memory may be an embedded NVRAM 101, and BIOS 106 includes instructions for managing the boot-up process of a computing system. In embodiments, BIOS 106 may comply with UEFI specification version 2.7A, dated September 2017 or other later versions as disclosed at www.uefi.org. NVRAM 101 may also include a Firmware Interface Table (FIT) 109 as disclosed in the UEFI specification for use in the booting process. Further, NVRAM 101 may include component configuration information (CC Info) 108 describing components installed in a computing system. In an embodiment, CC Info 108 may include the serial numbers of memory devices (e.g., DIMMs) installed in a system memory of the computing system. In other embodiments, other identifying information for memory devices or peripheral devices may be included in CC Info 108.

Here, as is known in the art, a processor semiconductor chip includes other components supporting a complete computing system. For example, as seen in FIG. 1, processor semiconductor chip 100 includes a number of central processing unit (CPU) processing cores 102_1 through 102_N (which execute program code instructions), coupled via an interconnect 107 to one or more of a main memory controller 103 (to interface to the computing system's main memory), a peripheral control hub 104 (to interface with peripherals of the computing system (e.g., a display, a keyboard, a printer, non-volatile mass storage, network interfaces (such as an Ethernet interface and/or wireless network interface), etc.), cache 105, and possibly a special purpose processor (such as a graphics processing unit (GPU) and/or a digital signal processor (DSP), not depicted in FIG. 1) to offload specialized and/or numerically intensive computations from the CPU cores.

In embodiments of the present invention, processor semiconductor chip 100 of FIG. 1 includes embedded NVRAM 101. NVRAM 101 may be one or more of emerging non-volatile memory technologies such as Ferroelectric random-access memory (FeRAM), dielectric random-access memory, resistive random-access memory (ReRAM), Memristor random access memory, phase-change random access memory, three-dimensional cross-point random access memory (such as 3D XPoint™ commercially available from Intel Corporation), magnetic random-access memory (MRAM), and spin-torque transfer magnetic random-access memory (STT-MRAM). In one embodiment, NVRAM 101 is a three-dimensional cross-point RAM.

A number of these technologies can be integrated into a high-density logic circuit manufacturing process such as a manufacturing process used to manufacture a processor semiconductor chip 100 as depicted in FIG. 1. For instance, the storage cells of an emerging non-volatile memory may store different resistive states (e.g., the cell exhibits a higher resistance or a lower resistance depending on whether it has been programmed with a 1 or a 0) and reside in the metallurgy of the semiconductor chip above the semiconductor substrate.

Here, for instance, a storage cell may reside between orthogonally directed metal wires and a three-dimensional cross-point structure may be realized by stacking cells and their associated orthogonal wiring in the semiconductor chip's metallurgy. Additionally, the access granularities may be much finer grained than traditional non-volatile storage (which traditionally accesses data only in large sector or block-based accesses). That is, an emerging non-volatile memory may be designed to act as a true random-access memory that can support data accesses at byte level granularity or some modest multiple thereof per address value that is applied to the memory.

Notably, because of the locality of NVRAM 101 on-die, the time to access BIOS 106 and the time to persist any data (such as component configuration information (CC Info) 108) read by or written by the BIOS are dramatically reduced as compared to approaches that keep BIOS code and the persisted data off the processor semiconductor chip, such as in a EEPROM or flash memory, and accessible via peripheral control hub 104 and associated components and interfaces.

In various embodiments, the address space of the embedded NVRAM 101 is (at least partially) reserved for the use of the BIOS. That is, the embedded NVRAM 101 may be regarded as a special memory resource, e.g., different than main memory (which is external from processor semiconductor chip 100 and coupled to main memory controller 203) that the BIOS understands it has permission to access in order to read/write its particular data structures.

Thus, in various embodiments, the instruction set architecture of one or more of the processor's CPU cores 102 includes special memory access instructions that target the embedded NVRAM 101 rather than main memory or other memory. As such, in various embodiments, the BIOS may execute at least some of its respective instructions primarily out of main memory (e.g., the program code instructions may be transferred from NVRAM 101 into main memory) but program code of the BIOS to access NVRAM 101 for at least some of its data may include a special read instruction that targets the embedded NVRAM 101. In further embodiments, BIOS 106 is able to write to NVRAM 101 in order to update/persist any such data with another special write instruction that targets the embedded NVRAM 101.

Here, the special nature of a memory access instruction that targets the embedded NVRAM 101 can be designed into the instruction format of the instruction set architecture of the processor's CPU cores 102 with a special opcode or immediate operand that specifies memory access is to be directed to embedded NVRAM 101 rather than main memory. Alternatively, the address space of NVRAM 101 can be viewed as a privileged region of main memory address space. In this case, the NVRAM 101 can be accessed with a nominal memory access instruction but the BIOS has to be given special privileged status to access it.

According to various embodiments, BIOS 106 and component configuration information (CC Info) 108 may be programmed directly into the embedded NVRAM 101 as part of the processor semiconductor chip manufacturing process. As such, each time the processor's computing system boots up, the computing system does not need to access the BIOS from a flash memory or other mass storage, all of which are typically accessed over a peripheral control hub or other slower interface.

With processor 100 having embedded (on-die) NVRAM 101, a more architecturally compact solution may thus be realized for BIOS 106.

Figure 2:
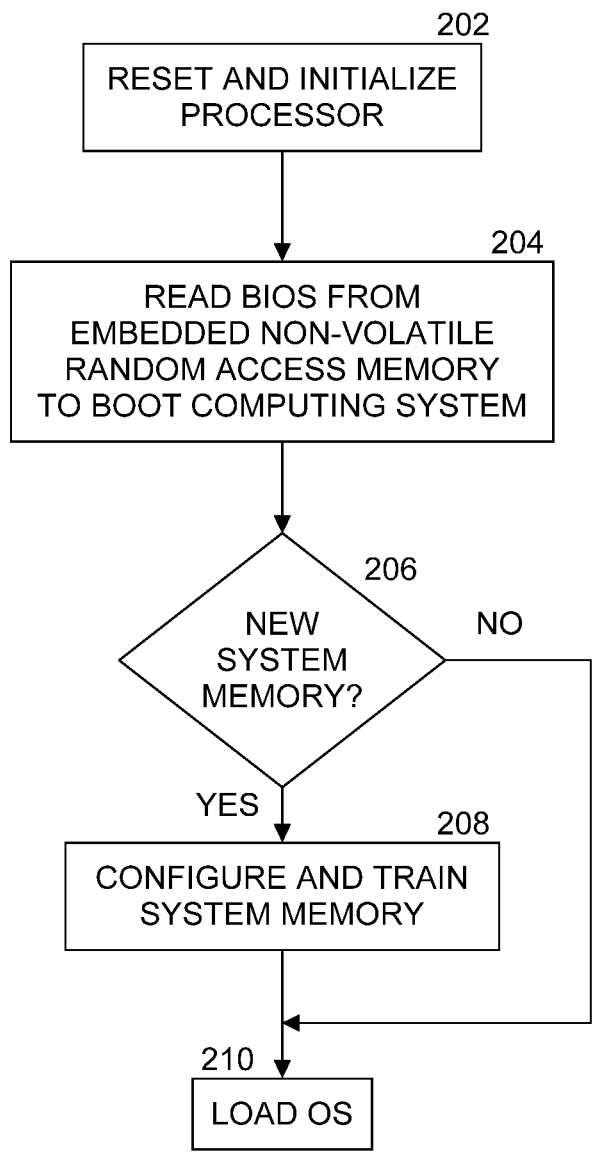
FIG. 2 illustrates an example of a logic flow that uses embedded NVRAM to boot a computing system.

FIG. 2 illustrates an example of a logic flow that uses embedded NVRAM. In some examples, the process as shown in FIG. 2 depicts a process to implement booting of a computing system. For these examples, this process may be implemented by or use components or elements of processor 100 shown in FIG. 1. However, this process is not limited to being implemented by or use only these components or elements of system 100.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Turning now to FIG. 2, boot processing begins at block 202. At block 202, processor semiconductor chip 100 may be reset and initialized. At block 204, BIOS 106 instructions and/or data may be read from NVRAM 101 and executed by one or more of the CPU cores 102_1, 102_2, 102_3, to 102_N. In embodiments, BIOS 106 may perform computing system initialization steps as described in UEFI specification version 2.7A, dated September 2017 or other later versions as disclosed at www.uefi.org. At the time of manufacturing a computing system including the processor semiconductor chip, a computing system manufacturer may obtain the serial number or other identifying information uniquely identifying each system memory device (such as a DIMM) and store this information as CC Info 108 into NVRAM 101 using BIOS 106. Whenever thereafter system memory is changed, such as when an additional DIMM is added or swapped out for a new one by an end user, the memory information in CC Info 108 may be updated by BIOS 106. In another embodiment, information about system components other than memory devices may also be stored in NVRAM 101.

At block 206, if BIOS 106 detects that the system memory is new (which may be when first installed during computing system manufacture time or subsequently added to or swapped) by comparing information about system memory detected by the BIOS with information stored in CC Info 108, BIOS configures and trains system memory at block 208. In embodiments this may include adjusting clocks and data edge and reference voltage levels (for reading) by sweeping across all possible address ranges, while writing and reading a linear-feedback shift register (LFSR) pattern. For large memories and/or for large numbers of memories in a computing system, this action may take a significant amount of time and result in a slow boot. By performing this action only when the system memory is installed, this extra boot time may be avoided during other, subsequent boots of the computing system. Processing continues with loading the OS at block 210. If at block 206 no new system memory is detected (because the information about installed and detected memory modules matches memory module information stored as CC Info 108 in the NVRAM, boot processing skips the configuration and training step at block 208 and proceeds to load the OS at block 210.

Figure 3:
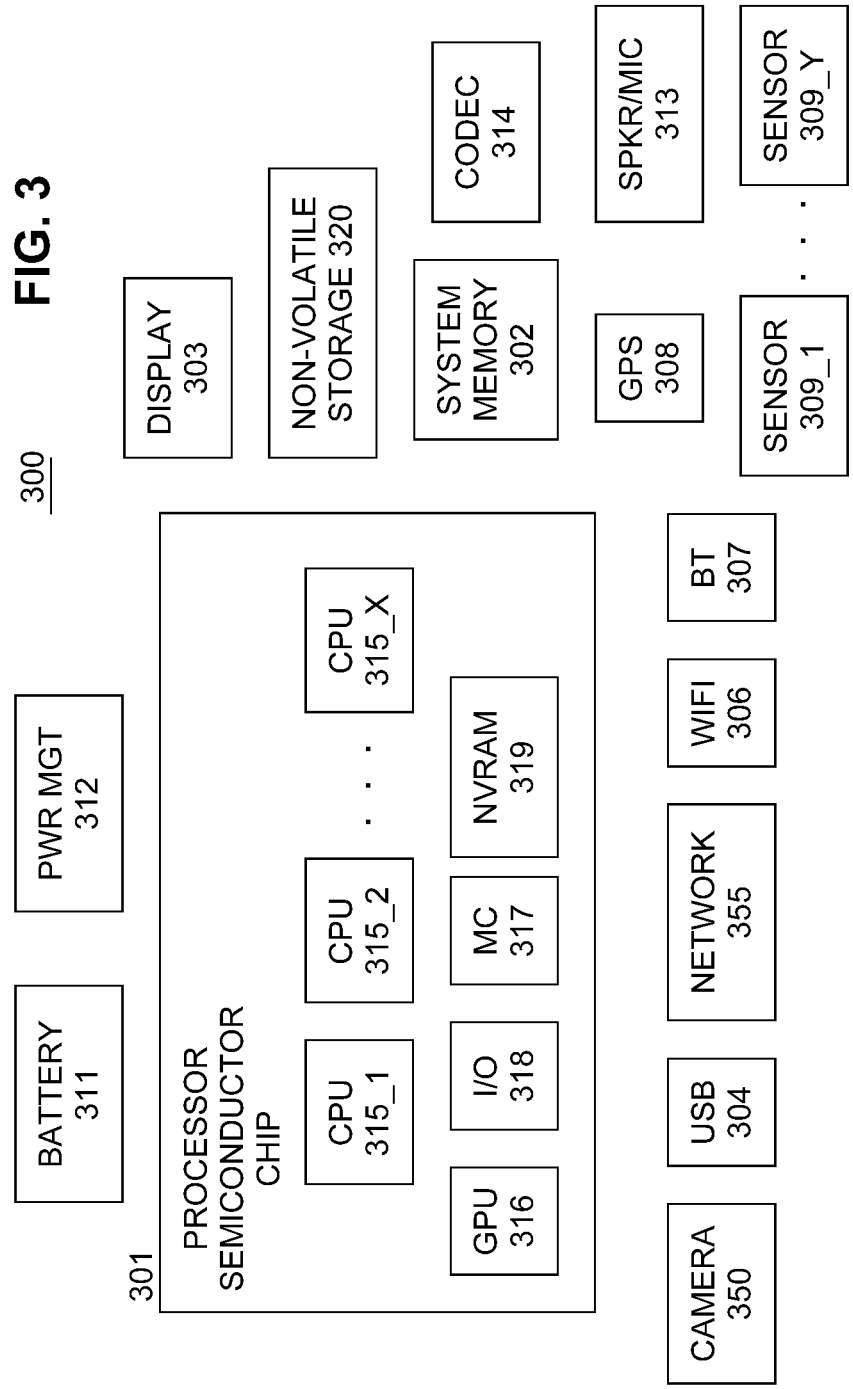
FIG. 3 illustrates an example computing system that can perform booting using embedded NVRAM on a processor semiconductor chip.

FIG. 3 illustrates an example computing system that can perform booting with embedded NVRAM on a processor semiconductor chip. According to some examples, computing system may include, but is not limited to, a server, a server array or server farm, a web server, a network server, an Internet server, a work station, a mini-computer, a main frame computer, a supercomputer, a network appliance, a web appliance, a distributed computing system, a personal computer, a tablet computer, a smart phone, multiprocessor systems, processor-based systems, or combination thereof.

As observed in FIG. 3, the computing system 300 may include a processor semiconductor chip 301 (which may include, e.g., a plurality of general purpose processing cores 315_1 through 315_X) and a main memory controller (MC) 317 disposed on a multi-core processor or applications processor, system memory 302, a display 303 (e.g., touchscreen, flat-panel), a local wired point-to-point link (e.g., USB) interface 304, various network I/O functions 355 (such as an Ethernet interface and/or cellular modem subsystem), a wireless local area network (e.g., WiFi) interface 306, a wireless point-to-point link (e.g., Bluetooth (BT)) interface 307 and a Global Positioning System (GPS) interface 308, various sensors 309_1 through 309_Y, one or more cameras 350, a battery 311, a power management control unit (PWR MGT) 312, a speaker and microphone (SPKR/MIC) 313 and an audio coder/decoder (codec) 314. The power management control unit 312 generally controls the power consumption of the system 300.

An applications processor or multi-core processor 301 may include one or more general purpose processing cores 315 within processor semiconductor chip 301, one or more graphical processing units (GPUs) 316, a memory management function 317 (e.g., a memory controller (MC)) and an I/O control function 318. The general-purpose processing cores 315 execute the operating system and application software of the computing system. The graphics processing unit 316 executes graphics intensive functions to, e.g., generate graphics information that is presented on the display 303. The memory control function 317 interfaces with the system memory 302 to write/read data to/from system memory 302. The processor 301 may also include embedded NVRAM 319 as described above to improve overall operation of BIOS 106 that executes on one or more of the CPU cores 315.

Each of the touchscreen display 303, the communication interfaces 304, 355, 306, 307, the GPS interface 308, the sensors 309, the camera(s) 310, and the speaker/microphone codec 313, and codec 314 all can be viewed as various forms of I/O (input and/or output) relative to the overall computing system including, where appropriate, an integrated peripheral device as well (e.g., the one or more cameras 310). Depending on implementation, various ones of these I/O components may be integrated on the applications processor/multi-core processor 301 or may be located off the die or outside the package of the applications processor/multi-core processor 301. The computing system also includes non-volatile storage 320 which may be the mass storage component of the system.

Figure 4:
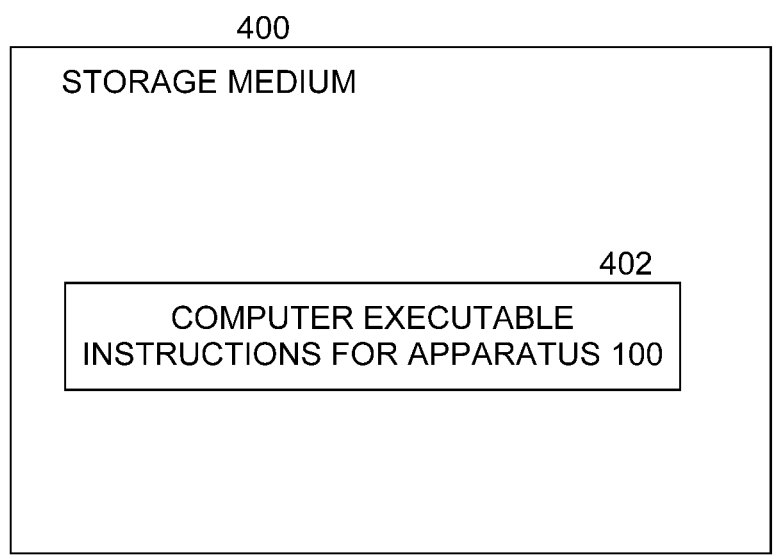
FIG. 4 illustrates an example storage medium.

FIG. 4 illustrates an example of a first storage medium. As shown in FIG. 4, the first storage medium includes a storage medium 400. The storage medium 400 may comprise an article of manufacture. In some examples, storage medium 400 may include any non-transitory computer readable medium or machine readable medium, such as an optical, magnetic or semiconductor storage. Storage medium 400 may store various types of computer executable instructions, such as instructions to implement logic flows 200 and/or BIOS 106. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
    one or more memory modules; and
    a processor semiconductor chip, the processor semiconductor chip comprising one or more processing cores; and
        a three dimensional cross-point memory coupled to the one or more processing cores, the three dimensional cross-point memory storing BIOS instructions that when executed by the one or more processing cores manages a boot process for the computing system, wherein the BIOS includes instructions to compare information describing the one or more memory modules with information about the one or more memory modules as stored in the three dimensional cross-point memory, and instructions to train the one or more memory modules when the information describing the one or more memory modules does not match the information about the one or more memory modules as stored in the three dimensional cross-point memory wherein instructions to train the one or more memory modules comprise instructions to adjust clocks and data edge and reference voltage levels for reading by sweeping across all possible address ranges, while writing and reading a linear-feedback shift register (LFSR) pattern.

2. The computer system of claim 1, wherein the BIOS comprises a Unified Extensible Firmware Interface (UEFI) BIOS.

3. The computing system of claim 1, wherein the information describing one or more memory modules is stored in the three dimensional cross-point memory at time of manufacturing of the computing system.

4. A method comprising:
    reading a BIOS from a three dimensional cross-point memory embedded in a processor semiconductor chip having one or more processing cores;
    executing the BIOS by the one or more processing cores to boot a computing system;
    comparing information describing one or more memory modules installed in the computing system with information about the one or more memory modules as stored in the three dimensional cross-point memory; and
    training the one or more memory modules when the information describing the one or more memory modules installed in the computing system does not match the information about the one or more memory modules as stored in the three dimensional cross-point memory, wherein training the one or more memory modules comprises adjusting clocks and data edge and reference voltage levels for reading by sweeping across all possible address ranges, while writing and reading a linear-feedback shift register (LFSR) pattern.

5. The method of claim 4, wherein the BIOS comprises a Unified Extensible Firmware Interface (UEFI) BIOS.

6. The method of claim 4, wherein the information describing the one or more memory modules comprises a serial number.

7. The computer system of claim 1, wherein an instruction format of an instruction set architecture of the processor semiconductor chip's one or more cores includes at least one of an opcode or an immediate operand that specifies memory access is to be directed to the three dimensional cross-point memory.

* * * * *